United States Patent
Ravinoothala

(10) Patent No.: US 11,005,805 B2
(45) Date of Patent: *May 11, 2021

(54) MANAGING LINK AGGREGATION TRAFFIC IN EDGE NODES

(71) Applicant: Nicira, Inc., Palo Alto, CA (US)

(72) Inventor: Sreeram Ravinoothala, San Jose, CA (US)

(73) Assignee: Nicira, Inc., Palo Alto, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 16/289,971

(22) Filed: Mar. 1, 2019

(65) Prior Publication Data

US 2019/0260706 A1    Aug. 22, 2019

Related U.S. Application Data

(63) Continuation of application No. 14/800,668, filed on Jul. 15, 2015, now Pat. No. 10,243,914.

(51) Int. Cl.
*H04L 29/12* (2006.01)
*H04L 12/803* (2013.01)
(Continued)

(52) U.S. Cl.
CPC ........ *H04L 61/103* (2013.01); *G06F 9/45558* (2013.01); *H04L 45/245* (2013.01);
(Continued)

(58) Field of Classification Search
CPC ....... G06F 2009/45595; G06F 9/45558; H04L 45/245; H04L 45/74; H04L 47/125;
(Continued)

(56) References Cited

U.S. PATENT DOCUMENTS 7,478,173 B1    1/2009  Delco
7,925,850 B1 *  4/2011  Waldspurger ......... G06F 9/4856
                                                             711/162
(Continued)

OTHER PUBLICATIONS

Cavilla et al.. "SnowFlock: Virtual Machine Cloning as a First-Class Cloud Primitive", Feb. 23, 2011, ACM, ACM Transactions on Computer Systems, vol. 29, No. 1, Article 2, pp. 1-3.

(Continued)

*Primary Examiner* — Un C Cho
*Assistant Examiner* — Shah M Rahman
(74) *Attorney, Agent, or Firm* — Patterson + Sheridan, LLP

(57) ABSTRACT

Exemplary methods, apparatuses, and systems include a first network edge device configuring a mapping between a physical network interface and a plurality of logical interfaces. A second network edge device also configures a mapping between a physical network interface and a copy of the plurality of logical interfaces. Each of the logical interfaces is assigned a corresponding set of first and second layer networking addresses that is replicated across the first and second network edge devices. The first network edge device receives a first address resolution request via the physical network interface of the first network edge device that includes a source and a destination. The destination is an address assigned to one of the plurality of logical interfaces. The first network edge device determines a second layer networking address assigned to the destination logical interface and transmits an address resolution response including the determined second layer networking address.

23 Claims, 6 Drawing Sheets

(51) Int. Cl.
*G06F 9/455* (2018.01)
*H04L 12/709* (2013.01)
*H04L 12/931* (2013.01)
*H04L 12/741* (2013.01)

(52) U.S. Cl.
CPC .. *H04L 47/125* (2013.01); *G06F 2009/45595* (2013.01); *H04L 45/74* (2013.01); *H04L 49/70* (2013.01); *Y02D 30/50* (2020.08)

(58) Field of Classification Search
CPC ... H04L 49/70; H04L 61/103; H04L 12/4633; Y02D 50/30
See application file for complete search history.

(56) References Cited

U.S. PATENT DOCUMENTS

| | | | |
|---|---|---|---|
| 9,037,719 B2 | 5/2015 | Shen et al. | |
| 9,178,816 B1* | 11/2015 | Ojha | H04L 45/74 |
| 9,350,666 B2 | 5/2016 | Ravinoothala et al. | |
| 9,477,524 B2 | 10/2016 | Kang | |
| 9,509,615 B2 | 11/2016 | Ravinoothala et al. | |
| 9,537,798 B1 | 1/2017 | Devilbiss et al. | |
| 2002/0156612 A1 | 10/2002 | Schulter et al. | |
| 2006/0039366 A1 | 2/2006 | Ghosh et al. | |
| 2007/0043860 A1 | 2/2007 | Pabari | |
| 2007/0079307 A1 | 4/2007 | Dhawan et al. | |
| 2007/0140263 A1 | 6/2007 | Mitome et al. | |
| 2008/0112323 A1 | 5/2008 | Agmon et al. | |
| 2008/0273456 A1 | 11/2008 | Messing et al. | |
| 2010/0257269 A1 | 10/2010 | Clark | |
| 2010/0287548 A1 | 11/2010 | Zhou et al. | |
| 2011/0010515 A1 | 1/2011 | Ranade | |
| 2011/0032945 A1 | 2/2011 | Mullooly et al. | |
| 2011/0182289 A1 | 7/2011 | Raman | |
| 2011/0194563 A1 | 8/2011 | Shen et al. | |
| 2011/0202920 A1 | 8/2011 | Takase | |
| 2011/0251992 A1* | 10/2011 | Bethlehem | H04L 67/306 707/610 |
| 2011/0292931 A1 | 12/2011 | Kizawa et al. | |
| 2011/0299534 A1 | 12/2011 | Koganti et al. | |
| 2012/0087372 A1 | 4/2012 | Narasimhan | |
| 2012/0210416 A1 | 8/2012 | Mihelich et al. | |
| 2012/0275297 A1 | 11/2012 | Subramanian | |
| 2012/0287787 A1* | 11/2012 | Kamble | H04L 49/201 370/235 |
| 2012/0287939 A1 | 11/2012 | Leu et al. | |
| 2012/0307828 A1 | 12/2012 | Agarwal et al. | |
| 2013/0007506 A1* | 1/2013 | Jain | G06F 11/1484 714/4.12 |
| 2013/0019014 A1 | 1/2013 | Johnsen et al. | |
| 2013/0044636 A1* | 2/2013 | Koponen | H04L 41/0803 370/254 |
| 2013/0117429 A1* | 5/2013 | Koponen | H04L 41/00 709/223 |
| 2013/0136126 A1 | 5/2013 | Wang et al. | |
| 2013/0156028 A1 | 6/2013 | Hernandez et al. | |
| 2013/0198355 A1 | 8/2013 | Kalyanaraman et al. | |
| 2013/0227108 A1 | 8/2013 | Dunbar et al. | |
| 2013/0308647 A1 | 11/2013 | Rosset et al. | |
| 2013/0318219 A1 | 11/2013 | Kancherla | |
| 2013/0336337 A1 | 12/2013 | Gopinath et al. | |
| 2013/0339516 A1 | 12/2013 | Chauhan et al. | |
| 2013/0339547 A1 | 12/2013 | Math et al. | |
| 2014/0036924 A1 | 2/2014 | Christenson | |
| 2014/0286345 A1* | 9/2014 | Mohandas | H04L 49/25 370/401 |
| 2014/0307540 A1 | 10/2014 | Duda et al. | |
| 2014/0307553 A1 | 10/2014 | Fung | |
| 2014/0314094 A1 | 10/2014 | Saltsidis et al. | |
| 2014/0351443 A1 | 11/2014 | Tang et al. | |
| 2014/0355445 A1 | 12/2014 | Dong et al. | |
| 2014/0365680 A1 | 12/2014 | Van Bemmel | |
| 2014/0376556 A1 | 12/2014 | Haggar et al. | |
| 2015/0026321 A1 | 1/2015 | Ravinoothala et al. | |
| 2015/0026344 A1 | 1/2015 | Ravinoothala et al. | |
| 2015/0026345 A1 | 1/2015 | Ravinoothala et al. | |
| 2015/0026681 A1 | 1/2015 | Lin et al. | |
| 2015/0029848 A1 | 1/2015 | Jain | |
| 2015/0074054 A1* | 3/2015 | Antony | G06F 16/128 707/639 |
| 2015/0106804 A1 | 4/2015 | Chandrashekhar et al. | |
| 2015/0117256 A1 | 4/2015 | Sabaa et al. | |
| 2015/0124586 A1 | 5/2015 | Pani | |
| 2015/0172190 A1 | 6/2015 | Song | |
| 2015/0195137 A1 | 7/2015 | Kashyap et al. | |
| 2015/0263991 A1 | 9/2015 | Macchiano et al. | |
| 2016/0087910 A1 | 3/2016 | Mittal et al. | |
| 2016/0162429 A1 | 6/2016 | Krishnamurthy et al. | |
| 2016/0182380 A1* | 6/2016 | Mehra | H04L 45/7453 709/226 |
| 2016/0218991 A1 | 7/2016 | Sharabi et al. | |
| 2017/0005947 A1 | 1/2017 | Chu | |
| 2017/0019370 A1 | 1/2017 | Ravinoothala | |

OTHER PUBLICATIONS

Microsoft et al., "Cloning Windows Server terminal server for load balancing cluster", Feb. 25, 2011, Microsoft Corporation, https://social.technet.microsoft.com/Forums/Azurefen-US/ae26817c-dde4-41f9-8388-e47befb3badb/cloning-windows-server-terminal-server-for-load-balancing-cluster?forum=winserverTS, pp. all.
Final Office Action from U.S. Appl. No. 14/800,673, dated Sep. 25, 2017, 36 pages.
Non-Final Office Action from U.S. Appl. No. 14/181,526, dated Nov. 1, 2017, 17 pages.
Final Office Action from U.S. Appl. No. 14/181,526, dated Mar. 6, 2017, 16 pages.
Non-Final Office Action from U.S. Appl. No. 14/800,673, dated May 19, 2017, 67 pages.
David C. Plummer, "Request for Comments: 826 An Ethernet Address Resolution Protocol", Nov. 1982, Network Working Group https://toolsierf.org/html/rfc826, Rfc 826, pp. All.
Non-Final Office Action for U.S. Appl. No. 14/181,526, dated Oct. 8, 2015, 18 pages.
Final Office Action for U.S. Appl. No. 13/947,934. dated Nov. 6, 2015, 45 pages.
Notice of Allowance for U.S. Appl. No. 13/947,971, dated Jan. 11, 2016, 24 pages.
Non-Final Office Action for U.S. Appl. No. 13/947,952, dated Feb. 12, 2016, 13 pages.
Notice of Allowance for U.S. Appl. No. 13/947,934, dated Feb. 14, 2017, 21 pages.
Non Final Office Action from U.S. Appl. No. 13/947,934, dated Aug. 12, 2016, 54 pages.
Non Final Office Action from U.S. Appl. No. 14/181,526, dated Aug. 2, 2016, 28 pages.
Notice of Allowance from U.S. Appl. No. 13/947,952, dated Jul. 29, 2016, 19 pages.
Non Final Office Action for U.S. Appl. No. 13/947,934, dated Jun. 18, 2015, 35 pages.
Non Final Office Action for U.S. Appl. No. 13/847,971, dated Jul. 2, 2015, 49 pages.

* cited by examiner

400

| Actor | Action | Source IP | Destination IP | Source MAC | Destination MAC |
|---|---|---|---|---|---|
| VM | ARP request | VM IP | LIF IP (default gateway) | VM MAC | Broadcast |
| Switch | Select Edge via LAG and via uplinks | | | | |
| Switch | Forward ARP request (via selected LAG & uplinks) | VM IP | LIF IP (default gateway) | VM MAC | Broadcast |
| Edge 2 | Match LIF IP address to LIF MAC address | | | | |
| Edge 2 | ARP response (via LAG) | LIF IP (default gateway) | VM IP | LIF MAC | VM MAC |
| Switch | Forward ARP response | LIF IP (default gateway) | VM IP | LIF MAC | VM MAC |
| VM | ICMP Echo | VM IP | 3rd party IP | VM MAC | LIF MAC |
| Switch | Select Edge via LAG | | | | |
| Switch | Forward ICMP echo (via LAG) | VM IP | 3rd party IP | VM MAC | LIF MAC |
| Edge 8 | Look up gateway (b/c 3rd party IP) | | | | |
| Edge 8 | ARP request (via LAG) | E8 Uplink IP | Gateway IP (router) | E8 Uplink MAC | Broadcast |
| Switch | Forward ARP request | E8 Uplink IP | Gateway IP (router) | E8 Uplink MAC | Broadcast |
| Router | ARP response | Router IP | E8 Uplink IP | Router MAC | E8 Uplink MAC |
| Switch | Select Edge via LAG | | | | |
| Switch | Forward ARP response | Router IP | E8 Uplink IP | Router MAC | E8 Uplink MAC |
| Edge 1 | Encapsulate and forward | Router IP | E8 Uplink IP | Router MAC | E8 Uplink MAC |
| Switch | Forward encapsulated ARP response | | | | |
| Edge 8 | Receive ARP response & forward ICMP echo | VM IP | 3rd party IP | E8 Uplink MAC | Router MAC |
| Switch | Forward ICMP echo | VM IP | 3rd party IP | E8 Uplink MAC | Router MAC |

FIG. 4

| Actor | Action | Source IP | Destination IP | Source MAC | Destination MAC |
|---|---|---|---|---|---|
| Router | Receive ICMP reply from 3rd party | 3rd party IP | VM IP | 3rd party MAC | Router MAC |
| Router | ARP request | Router IP | Uplink (Edge 3 selected via ECMP) | Router MAC | Broadcast |
| Switch | Select Edge via LAG and via uplinks | | | | |
| Switch | Forward ARP request | Router IP | Uplink (Edge 3 selected via ECMP) | Router MAC | Broadcast |
| Edge 1 | Encapsulate and forward | | | | |
| Edge 3 | ARP response (via LAG) | Uplink IP (E3) | Router IP | Uplink MAC (E3) | Router MAC |
| Switch | Forward ARP response | Uplink IP (E3) | Router IP | Uplink MAC (E3) | Router MAC |
| Router | Forward ICMP reply from 3rd party | 3rd party IP | VM IP | Router MAC | Uplink MAC (E3) |
| Switch | Select Edge via LAG | | | | |
| Switch | Forward ICMP reply from 3rd party | 3rd party IP | VM IP | Router MAC | Uplink MAC (E3) |
| Edge 8 | Forward ICMP reply from 3rd party | 3rd party IP | VM IP | LIF MAC | VM MAC |

FIG. 5

MANAGING LINK AGGREGATION TRAFFIC IN EDGE NODES

CROSS-REFERENCE TO RELATED APPLICATIONS

This application is a continuation of copending U.S. application Ser. No. 14/800,668, titled "MANAGING LINK AGGREGATION TRAFFIC IN EDGE NODES," filed on Jul. 15, 2015, the entire contents of which is hereby incorporated by reference herein.

FIELD OF THE INVENTION

The various embodiments described herein relate to managing link aggregation traffic in a virtual environment. In particular, the embodiments relate to using a link aggregation group to implement load balancing of data link layer processing between multiple network edge devices or other network edge nodes.

BACKGROUND OF THE INVENTION

Load balancing distributes workload across multiple physical or virtual machines. In a datacenter environment, a load balancer may be implemented using link aggregation. For example, multiple physical and/or virtual machines may serve as a network edge node, such as a gateway or router. As each packet is received, one of multiple network edge nodes is selected to process the packet as a result of each network edge node having a physical network interface/port included within a common link aggregation group. Load balancing between network edges distributes the work of network layer packet processing and, as a result, increases network throughput. Load balancing between network edge nodes, however, is complicated by the mapping of data link layer addresses to each edge node and by the handling of packets that are destined for a specific network edge node but received by another network edge node.

BRIEF DESCRIPTION OF THE DRAWINGS

The present invention is illustrated by way of example and not limitation in the figures of the accompanying drawings, in which like references indicate similar elements, and in which:

FIGS. 4-5 illustrate an exemplary packet flow in a network including the load balancing of traffic among and managing traffic between network edge nodes.

DETAILED DESCRIPTION

Embodiments described herein balance traffic among and manage traffic between network edge devices. In particular, embodiments configure a mapping between a physical network interface of a first network device and a plurality of logical interfaces within the first network device. One or more additional network devices also configure a mapping between a corresponding physical network interface and a copy of the plurality of logical interfaces within the corresponding network device. Each of the logical interfaces is assigned a set of first and second layer networking addresses (e.g., addresses for layers 3 and 2 in the OSI model) that is replicated across the network edge devices. The replicated logical interfaces will therefore share the same data link layer (e.g., MAC) address. For example, each logical interface may serve as a default gateway for a different subnet of VMs or other networked machines. As a result, each edge device is able to process packets directed to any of the replicated logical interfaces.

Some packets subject to load balancing, e.g., due to the use of a link aggregation group to implement the load balancing, are delivered to one edge device when actually destined for a particular edge device. To address this complication, embodiments recognize packets that are to be processed by a particular edge device and forward the packets as necessary. In one embodiment, edge devices encapsulate such packets and forward the encapsulated packets via a synchronization port.

Figure 1:
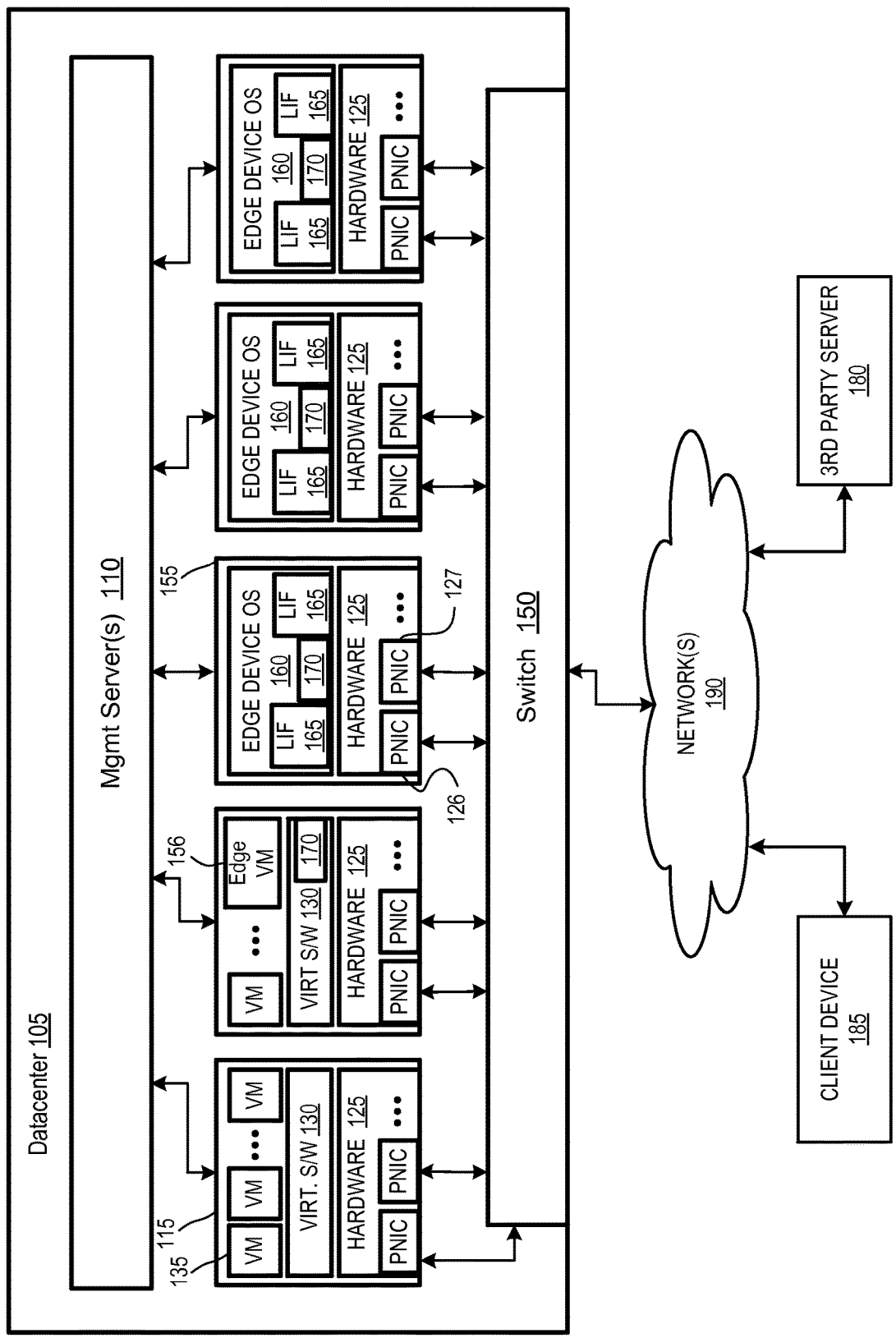
FIG. 1 illustrates, in block diagram form, an exemplary virtualized datacenter including a system to perform load balancing traffic among and managing traffic between network edge nodes.

FIG. 1 illustrates, in block diagram form, exemplary virtualized datacenter 105, including a system to perform load balancing traffic among and managing traffic between network edge nodes. Server-based computing in a virtualized datacenter environment allows client device(s) 185 to access centrally-managed virtual desktops and network services, such as those implemented by VM's 135, via network(s) 190 (e.g., a local area network or other private or publically accessible wide area network, such as the Internet).

Virtualized datacenter 105 includes multiple physical computers, host devices 115 and network edge devices 155. Each host device 115 includes a plurality of VM's 135. VM's 135 are complete computation environments, containing virtual equivalents of the hardware and system software components of a physical system and are typically implemented by an extensive virtualization infrastructure, which includes a variety of software and hardware components. For example, VMs 135 may implement virtual desktops or other network computing resources. In one embodiment, client device 185 may cause a corresponding VM 135 to exchange packets with a third party server 180 to, e.g., download a file/webpage or execute another service.

Virtualization software layer 130 (e.g., a hypervisor) running on hardware 125 of each host device 115 manages one or more respective VM's 135. Virtualization software layer 130 manages physical resources as well as maintains virtual-to-physical hardware mappings. For example, virtualization software layer 130 may map logical interfaces (LIFs) to physical ports as described further below.

Embodiments described herein utilize network edge devices (also referred to herein as edge nodes). Network edge devices perform one or more functionalities, including serving as a gateway for a network or subnet and/or as a router. For example, datacenter 105 is illustrated as including multiple network edge devices. In some embodiments, edge device operating system 160 runs directly on hardware 125 (e.g., without virtualization software layer 130). These embodiments may be referred to as "bare metal" edge devices 155. Other embodiments include one or more VMs implementing network edge nodes 156. Edge VMs 156, as implemented by host devices 115, are also referred to herein as network edge devices and may run similar operating systems to edge device operating system 160.

At least one of management server(s) 110 is coupled to each host device 115 and edge device 155. Management server(s) 110 may be responsible for provisioning and maintaining a multitude of VM's 135. Additionally, management server(s) 165 may configure one or more agents 170 for the implementation of load balancing traffic among and managing traffic between network edge nodes.

Agent 170 runs within, or in conjunction with, virtualization software layer 115 and/or within, or in conjunction with, edge device operating system 160. Agent 170 manages the configuration of logical interfaces and physical ports. In one embodiment, agent 170 receives configuration information from one of management server(s) 110. For example, each agent 170 may receive and maintain a mapping of which port(s) (e.g., port 126) to include within a link aggregation group (LAG). Agent 170 initiates configuration of a LAG within edge devices 155 and/or host devices 115 based upon the configuration information. Additionally, management server(s) 110 provide agents 170 with a mapping of logical interfaces (LIFs 165) to various network or subnet connections for edge devices. For example, each LIF 165 may be a separately addressable interface that represents a connection between a subnet and a network edge device or an uplink interface between the network edge device and external networks 190. In one embodiment, multiple LIFs 165 utilize a single physical port while maintaining a separate address. An exemplary address mapping of a LIF includes a first layer networking address, such as a network layer address, and a second layer networking address, such as a data link layer address. Each LIF 165 and its corresponding mapping may be replicated across multiple network edge devices. As used herein, the term media access control (MAC) address may be used interchangeably with a data link layer address and the term Internet Protocol (IP) address may be used interchangeably with a network layer address. References to first layer and second layer, however, are not intended to correspond to the order or numbering of layers as set forth in the Open Systems Interconnection model (OSI Model) and are simply used to differentiate between two different layers.

Hardware 125 includes one or more ports 126 and 127. Ports 126 and 127 are physical network interfaces used to connect host devices 115 and/or edge device 155 to switch(es) 150. In one embodiment, connections or links between ports 126 of network edge devices and switch 150 may be configured into a LAG. For example, the configuration may be implemented via negotiation between edge devices 155 (and/or host devices 115) and switch 150 coupled to ports 126. In one embodiment, the LAG is configured according to the Link Aggregation Control Protocol (LACP). Each agent 170 sends frames (e.g., LACP-DUs) down the links of ports 126. Switch 150, on the other end of the links, is enabled to handle LACP and sends frames up the same links. As a result, edge devices 155 (and/or host devices 115) and switch 150 detect links to combine into a single logical link. As used herein, packet refers to a packet or frame of network traffic according to a networking protocol and the terms "packet" and "frame" are used interchangeably.

In one embodiment, each of a plurality of agents 170 configures a corresponding port 126 of the edge device 155 and/or 156 to be included within a LAG as described above. Additionally, multiple LIFs 165 are replicated across the edge devices 155 and/or 156 and mapped to the corresponding ports 126. For example, a first LIF 165 being assigned a first data link layer address is replicated, with the same first data link layer address, in multiple network edge devices 155, a second LIF 165 being assigned a second data link layer address is replicated, with the same second data link layer address, in the multiple network edge devices 155, etc. As a result of the configuration of the LAG, switch 150 performs load balancing between links to corresponding ports 126. For example, when switch 150 receives a packet with a destination address associated with a LIF mapped to one of the ports 126 (e.g., in a routing table or other data structure maintained by switch 150), switch 150 selects a link corresponding to one of ports 126 to transmit the packet. In one embodiment, a port within the LAG is selected based upon a hash of a destination address or identifier, a round robin algorithm, or another load balancing algorithm. As a result, a first packet transmitted by one VM 135 to a default gateway address (assigned to a first LIF 165) may be sent via the LAG to a first edge device 155 for processing while a second packet destined for the same default gateway, transmitted by the same VM 135 or another device, may be sent via the LAG to a second edge device 155 for processing.

In one embodiment, each of a plurality of agents 170 configures a port 127 to serve as a synchronization port. For example, at least one port of each network edge device is used as a synchronization port and excluded from sharing a common LAG with any ports of any other network edge device. Each synchronization port is configured with a unique data link layer address, which may be inserted into a packet transmitted by a corresponding network edge device to transmit the packet between network edge devices without the packet being subjected to a load balancing algorithm or otherwise forwarded to a different network edge device than intended.

In one embodiment, each of a plurality of agents 170 further configures the corresponding port 127 as a tunnel endpoint. For example, a first network edge device 155 may receive a packet via the LAG that is to be processed by a second network edge device 155. First network edge device 155 encapsulates the received packet according to a tunneling protocol and forwards the encapsulated packet to the second network edge device 155 from port 127 of the first network edge device to the corresponding port 127 of the second network edge device.

Figure 2:
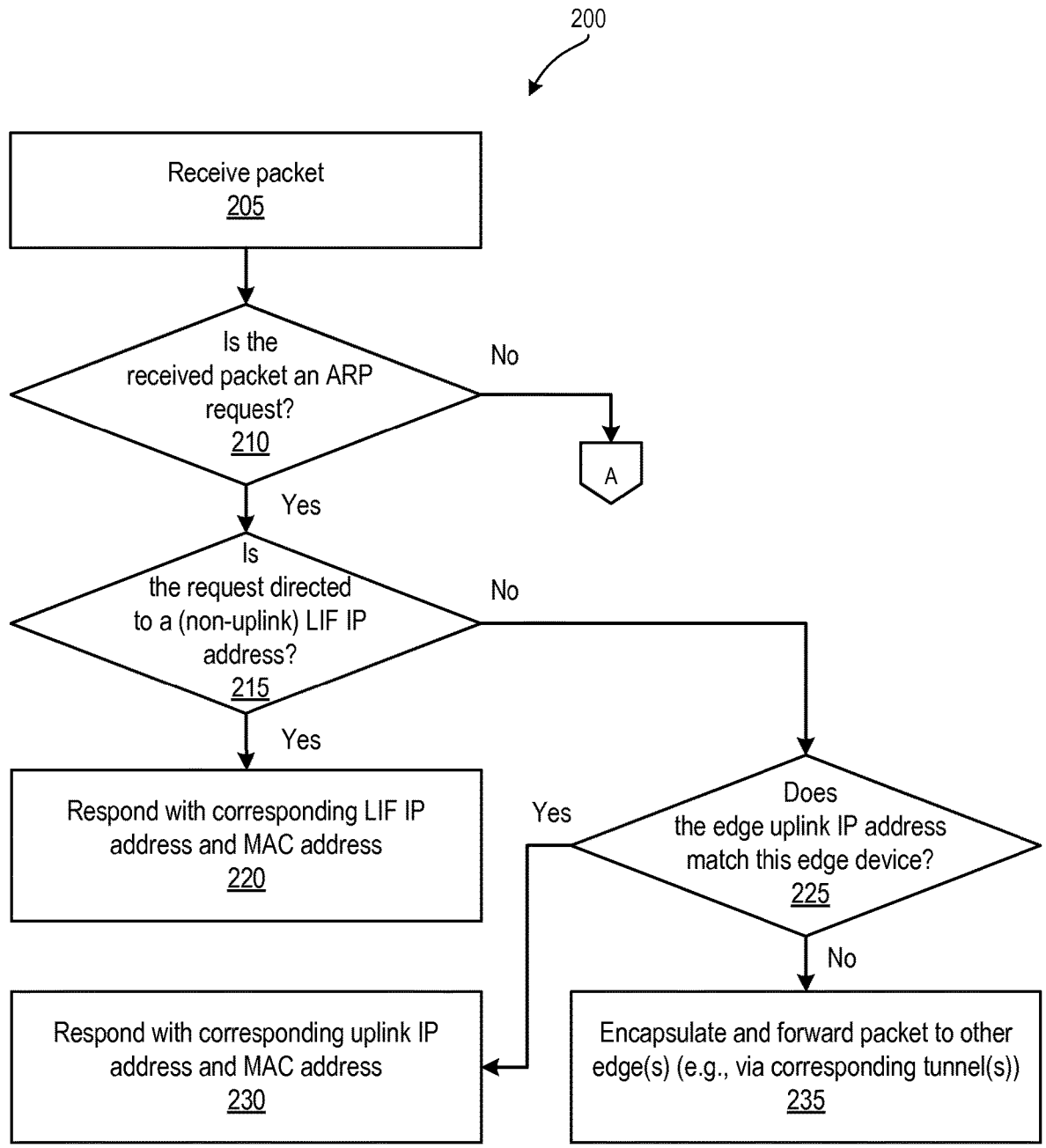
FIGS. 2-3 include a flow chart illustrating an exemplary method of balancing traffic among and managing traffic between network edge nodes.
Figure 3:
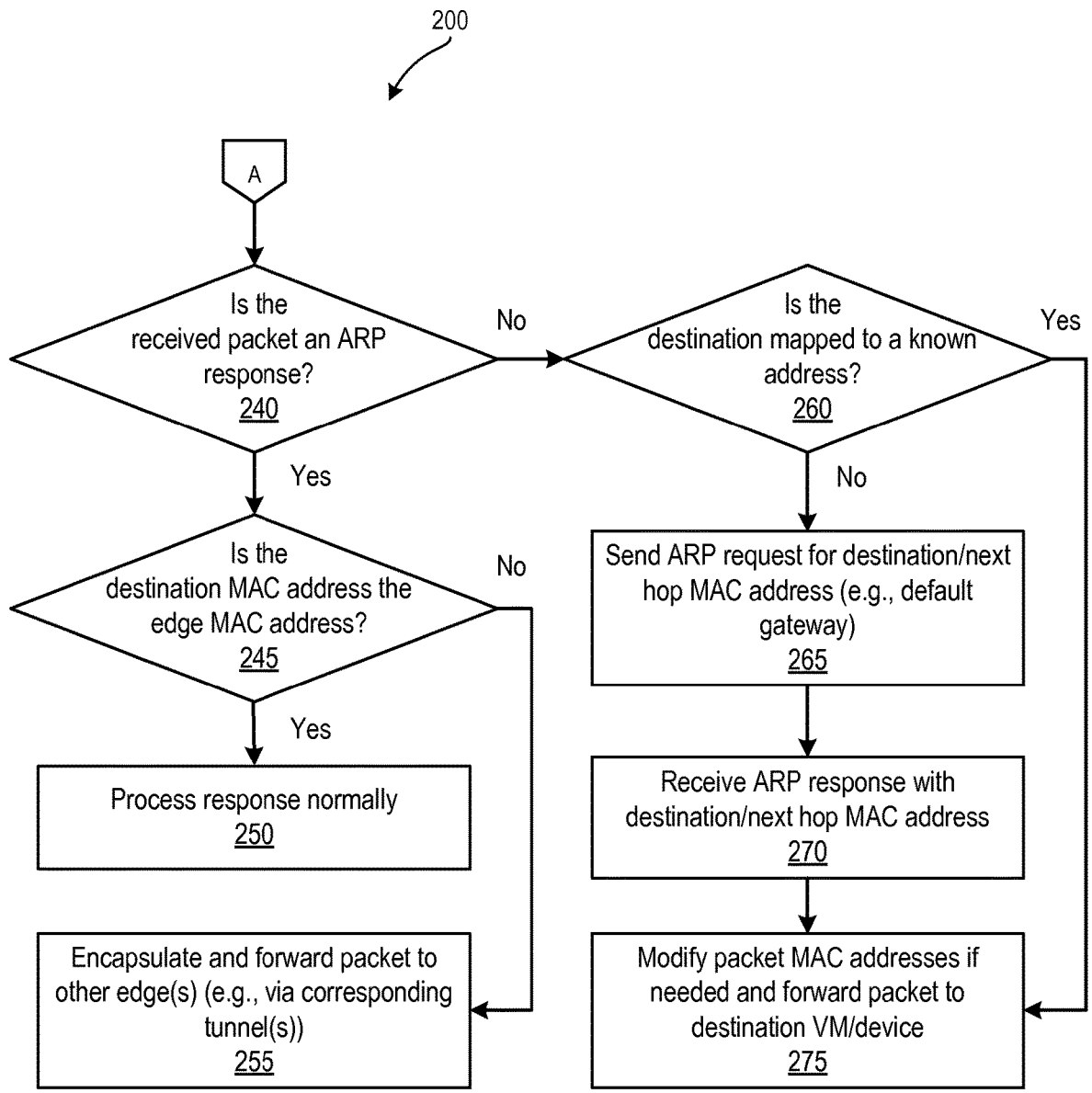

FIGS. 2-3 include a flow chart illustrating exemplary method 200 of balancing traffic among and managing traffic between network edge nodes. For example, similar to the description above, each network edge device 155 may include multiple LIFs 165 assigned to a port 126 that is included within a LAG or otherwise subjected to a load balancing algorithm. Each of a plurality of LIFs 165 is replicated across the network edge devices 155 and represents, e.g., a gateway for a subnet of VMs 135. In addition to the replicated LIFs 165, each network edge device includes a unique uplink LIF 165. For example, uplink LIF 165 connects the corresponding network edge device 155 with external networks 190.

At block 205, a first network edge device 155 receives a packet. In one embodiment, the packet is received via port 126 included within the LAG. Alternatively, the packet is received via synchronization port 127.

At block 210, first network edge device 155 determines if the received packet is an address resolution request. For example, the packet may be an Address Resolution Protocol (ARP) request transmitted as a broadcast. In one embodiment, the packet header information includes an indication of the packet type that is used to determine whether or not the packet is an address resolution request, an address resolution response, or another type of packet.

If the received packet is not an address resolution request, method 200 continues via off page connector A as described below. If the received packet is an address resolution request, at block 215, first network edge device 155 determines if the address resolution request is directed to a replicated LIF 165 (e.g., a gateway for a subnet of VMs 135). For example, first network edge device 155 inspects the destination of the address resolution request and determines if the first layer (e.g., IP layer) destination address is directed to a replicated LIF 165 within first network edge device 155, as configured by agent 170. In one embodiment, first network edge device 155 stores a table or other data structure mapping first layer addresses to LIFs 165. As described above, such a data structure may be received from or otherwise configured based upon data from management server(s) 110.

In one embodiment, an address resolution request packet received via synchronization port 127 (e.g., that has not been encapsulated and forwarded by another network edge device) is dropped or otherwise suppressed.

If the address resolution request includes a first layer destination address of a replicated LIF 165, at block 220, first network edge device 155 processes the request and responds with the corresponding second layer address. For example, first network edge device 155 stores a table or other data structure of network layer and data link layer address pairs assigned to each LIF 165. As described above, the mapping of LIFs 165 to address pairs may be configured by management server(s) 110. Upon determining the data link layer address that corresponds to the destination network layer address included in the request, first network edge device 155 transmits an address resolution response packet directed to the source of the address resolution request and including the network layer and data link layer addresses of the LIF 165 as the source addresses for the address resolution response packet. Given that (non-uplink) LIFs 165 are replicated across network edge devices 155, any of the multiple network edge devices 155 can receive, process, and respond to such an address resolution request. As a result of utilizing multiple network edge devices to process such packets, the system increases network throughput.

If the address resolution request includes a first layer destination address not directed to one of the replicated LIFs 165, at block 225, first network edge device 155 determines if the address matches the first layer address for the uplink for first network edge device 155. For example, LIFs 165 for uplinks are not replicated across multiple network edge devices 155. As a result, first network edge device 155 is able to compare the destination address against an uplink address that is unique to first network edge device 155.

If the destination address of the address resolution packet matches the first layer address for the uplink for first network edge device 155, at block 230, first network edge device 155 processes and responds to the request. For example, first network edge device 155 stores a table or other data structure of network layer and data link layer address pairs assigned to each LIF 165 within first network edge device 155. Upon determining the data link layer address that corresponds to the destination network layer address included in the request, first network edge device 155 transmits an address resolution response packet directed to the source of the address resolution request and including the network layer and data link layer addresses for the uplink as the source of the address resolution response.

If the destination address of the address resolution request packet does not match the first layer address for the uplink for first network edge device 155, at block 235, first network edge device 155 encapsulates and forwards the address resolution request to one more other edge devices 155. In one embodiment, first network edge device 155 stores a table or other data structure including network layer addresses assigned to each uplink LIF 165 and their corresponding mappings to network edge devices 155. Additionally, first network edge device 155 stores a table or other data structure mapping other network edge devices 155 to corresponding synchronization port 127 addresses. First network edge device 155 determines from a lookup of the destination address, which network edge device 155 includes an uplink LIF 165 corresponding to the destination address. First network edge device 155 encapsulates the address resolution request and forwards the encapsulated packet to the determined other network edge device 155. Alternatively, if the destination address of the address resolution request packet does not match any LIF, first network edge device 155 drops the packet.

In one embodiment, first network edge device 155 does not store a table or other data structure including network layer addresses assigned to each uplink LIF 165 and the corresponding mapping to other network edge devices 155. In such an embodiment, first network edge device 155 encapsulates and forwards the address resolution request packet to all of the other network edge devices 155 via their corresponding synchronization ports 127.

As a result, first network edge device 155 is able to detect an address resolution request packet received that is to be processed by another, specific network edge device 155. Given that the other network edge device 155 did not receive the address resolution request packet (e.g., because only a single network edge device 155 is selected to receive the packet as a result of the LAG), first network edge device 155 is able to forward the packet to the specific network edge device 155 for processing.

Continuing method 200 via off page connector A, at block 240, first network edge device 155 determines if the received packet is an address resolution response. For example, first network edge device 155 determines from packet header information whether or not the packet is an Address Resolution Protocol (ARP) response packet.

If the received packet is an address resolution response, at block 245, first network edge device 155 determines if the destination includes an address that corresponds to first network edge device 155. For example, first network edge device 155 may have broadcast an address resolution request packet using the network layer and data link layer addresses of the uplink LIF 165 of the first edge device 155 as the source of the address resolution request. The corresponding address resolution response packet would include the network layer and data link layer addresses of the uplink LIF 165 of the first edge device 155 as the destination. As a result, first network edge device 155 inspects the received address resolution response packet to determine if the destination matches the network layer and data link layer addresses of the uplink LIF 165 of the first edge device 155.

If the destination matches the address (e.g., the network layer and/or data link layer addresses) of the uplink LIF 165 of the first edge device 155, at block 250, first network edge device 155 processes the address resolution response normally. For example, first network edge device 155 updates a routing table or other data structure using the source addresses included in the address resolution response.

If the destination does not match the address (e.g., the network layer and/or data link layer addresses) of the uplink LIF 165 of first network edge device 155, at block 250, first network edge device 155 encapsulates and forwards the address resolution response to one more other edge devices 155. Similar to the embodiment described above, first network edge device 155 may store a table or other data structure mapping network layer addresses assigned to each uplink LIF 165 to the corresponding other network edge devices 155. Additionally, first network edge device 155 stores a table or other data structure mapping other network edge devices 155 to their corresponding synchronization port 127 addresses. First network edge device 155 determines from a lookup of the destination address, which network edge device 155 includes an uplink LIF 165 corresponding to the destination address. First network edge device 155 encapsulates the address resolution response and forwards the encapsulated packet to the determined other network edge device 155. Alternatively, if the destination address of the address resolution response packet does not match any LIF, first network edge device 155 drops the packet.

In one embodiment, first network edge device 155 does not store a table or other data structure mapping network layer addresses assigned to each uplink LIF 165 to the corresponding other network edge devices 155. In such an embodiment, first network edge device 155 encapsulates and forwards the address resolution response packet to all of the other network edge devices 155 via their corresponding synchronization ports 127.

If the received packet is not an address resolution response, at block 260, first network edge device 155 determines if the destination includes an address mapped to a LIF 165 within first network edge device 155. For example, first network edge device 155 inspects the packet and determines if the destination network or data link layer address matches the network or data link layer address of one of replicated LIFs 165 or the uplink LIF 165 unique to first network edge device 155. Additionally, first network edge device 155 determines if a next hop/default gateway address for forwarding the packet is known.

If the destination address is unknown (e.g., no LIF match and the next hop/default gateway data link layer address is unknown), at block 265, first network edge device 155 sends an address resolution request to the default gateway for first network edge device 155. For example, first network edge device 155 may receive a packet from a VM 135 bound for third party server 180 and first network edge device 155 has yet to establish a routing table entry for its own default gateway/next hop router. First network edge device 155 sends an ARP request to determine the destination address of the next router within network(s) 190 in order to forward the packet.

At block 270, first network edge device 155 receives an address resolution response from the next hop router/default gateway for first network edge device 155. For example, first network edge device 155 receives an ARP response including the network layer and data link layer addresses for the next router and updates a routing table within first network edge device 155.

If or once the destination is mapped to a known address, at block 275, first network edge device 155 forwards the packet to the destination. In one embodiment, first network edge device 155 modifies the second layer destination prior to forwarding the packet. For example, if the destination of the received packet includes a data link layer address mapped to a LIF 165 within first network edge device 155, first network edge device 155 updates the destination of the packet to include the data link layer address corresponding to the destination network layer address. In one embodiment, first network edge device 155 stores table or other data structure mapping network layer addresses to data link layer addresses. If the network layer address in the destination corresponds to a VM 135, first network edge device 155 looks up the mapping of the network layer address of the VM 135 to the data link layer address of the VM 135, updates the destination of the packet to replace, e.g., the uplink LIF data link layer address with the VM data link layer address and forwards the packet. If the network layer address in the destination corresponds to a third party server 180, first network edge device 155 looks up the mapping of the network layer address of the VM 135 to the data link layer address of the next hop router/default gateway for first network edge device 155 (e.g., within a routing table or by default), and updates the destination of the packet to replace, e.g., the replicated LIF data link layer address with the router data link layer address and forwards the packet.

FIGS. 4-5 illustrate exemplary packet flow 400 in a network including the load balancing of traffic among and managing traffic between network edge nodes. Exemplary packet flow 400 is one specific example of an implementation of method 200 as it may be applied by datacenter 105. In this example, datacenter 105 includes eight network edge devices that each have at least one physical port included in a common LAG.

Exemplary packet flow 400 begins with VM transmitting an ARP request to determine the destination address of its default gateway. The ARP request includes source network layer and data link layer addresses corresponding to the address pair assigned to the VM, a destination network layer address corresponding to the default gateway network layer address assigned to the VM (e.g., by a management server), and the destination data link layer address set to a broadcast value.

The switch selects a network edge device within the LAG (e.g., via a hash algorithm) and forwards the ARP request to the selected edge device. In other words, the switch only forwards the ARP request to a single port 126 of the group of edge device ports 126 included within the LAG. In this example, the switch selects the second network edge device and forwards the ARP request with the source and destination addresses unchanged. The switch also forwards the ARP request via synchronization ports and another non-LAG links to the switch.

The second network edge device receives the ARP request and inspects the destination network layer address. The second network device determines that the destination network layer address matches one of the replicated LIFs within the network edge devices. The second network edge device is therefore able to respond to the ARP request.

The second network edge device transmits an ARP response to the switch. The ARP response includes the destination addresses for the VM that sent the ARP response. Additionally, the ARP response includes source addresses including the replicated LIF network layer and data link layer addresses. As a result, each network edge that includes the replicated LIF is able to act the default gateway for the corresponding network or subnet of VMs.

The switch forwards the ARP response to the VM. The VM stores the source data link layer address received in the ARP response for its default gateway. For example, the VM may transmit an Internet Control Message Protocol (ICMP) echo via the default gateway to ping a third party server. The ICMP echo packet includes the source network layer and data link layer addresses corresponding to the address pair assigned to the VM, a destination network layer address corresponding to the third party server, and the destination data link layer address set to the LIF address returned in the ARP response.

The ARP response was transmitted by the network edge device via a LAG port, so the switch created an association between the LIF data link later address and the LAG. As a result, the switch once again selects a network edge device within the LAG (e.g., via a hashing algorithm) and forwards the ICMP echo packet to the selected network edge device. In this example, the switch selects the eighth network edge device.

Despite the second network edge device processing the ARP request, each of the network edge devices includes the replicated LIF and is able to process a packet including the LIF as a destination. Upon receiving the ICMP echo packet, the eighth network edge device determines that the destination network layer address is unknown and looks up the next hop router/default gateway for the network edge device.

In this example, the data link layer address for the router is unknown, so the eighth network edge device transmits an ARP request to determine the destination address of its default gateway. The ARP request includes source network layer and data link layer addresses corresponding to the address pair assigned to the unique uplink for the eighth network edge device, a destination network layer address corresponding to the default gateway/router network layer address assigned to the edge device, and the destination data link layer address set to a broadcast value. The eighth network edge device transmits the ARP request via the port included in the LAG.

The switch forwards the ARP request broadcast and the router, upon inspecting the packet, recognizes its own network layer address and responds. The ARP response from the router includes a destination set to the network and data link layer addresses for the eighth network edge uplink LIF and source set to the network and data link layer addresses for the router.

Given that the switch associated the data link layer address for the eighth network edge uplink LIF with the LAG due to the ARP request being sent via the LAG, the switch once again selects a network edge device within the LAG. In this example, the switch selects the first network edge device.

The first network edge device receives the ARP response and determines that the destination address is mapped to the eighth network edge device LIF uplink. The first edge device encapsulates the ARP response and forwards the encapsulated packet to the eighth network edge device via their respective synchronization ports. As the synchronization ports are not included in a common LAG, the encapsulated packet is passed by the switch directly to the eighth network edge device.

The eighth network device processes the ARP response to store the data link layer address for the router and forwards the ICMP echo to the router by updating the packet to include data link layer address for the router as a part of the destination and the data link layer address of the eighth network edge device uplink LIF as a part of the source.

The switch forwards the ICMP echo to the router, which in turn processes and forwards the ICMP echo on to the third party server.

Once the third party server responds, the router receives an ICMP reply. The ICMP reply includes the third party server network and data link layer addresses as a source and the router data link layer address and VM network layer address as a destination.

In one embodiment, the uplinks of the network edge devices are configured for equal cost multi-path (ECMP) routing. As a result, the router selects one of the uplinks of the plurality of network edge devices. In this example, the router selects the uplink for the third network edge device. If the data link layer address for the third network edge device uplink LIF is not known to the router (e.g., within a routing table or other data structure), the router transmits an ARP request destined for the network layer address of the third network edge device uplink.

Once again, the switch forwards the ARP request and, due to the LAG, selects a network edge device to receive the ARP request. In this example, the switch selects the first network edge device. Similar to the description above, the first network edge device inspects the packet, matches the destination network layer address to the uplink LIF of the third network edge device, encapsulates the ARP request, and forwards the encapsulated packet to the third network edge device.

The third network edge device receives, processes, and responds to the ARP request. The ARP response from the third network edge includes the network and data link layer addresses for the third network edge uplink LIF in the source and the network and data link layer addresses for the router in the destination.

The switch forwards the ARP response to the router and the router stores the data link layer address for the third network edge device uplink LIF (e.g., in a routing table). The router then proceeds by forwarding the IMCP reply to the switch with the VM network layer address and the third network edge device uplink data link layer address as a destination.

In an alternate embodiment, the router does not utilize ECMP routing and associates (e.g., in a routing table) the VM network layer address with the eighth network edge device uplink data link layer address and forwards the IMCP reply to the switch with the VM network layer address and the eighth network edge device uplink data link layer address as a destination.

Due to the LAG, the switch selects a network edge device to receive the IMCP reply. In this example, the switch selects the eighth network edge device. The eighth network edge device inspects the packet and determines that it has a stored mapping for the destination network layer address. As a result, the eighth network edge device is able to replace the data link layer address for the third network edge device uplink LIF with the VM data link layer address as the destination and forward the ICMP reply to the VM.

As illustrated in this packet flow, the system is able to utilize a LAG to load balance between multiple edge devices while recognizing and handling packets that are to be processed by specific edge devices.

Figure 6:
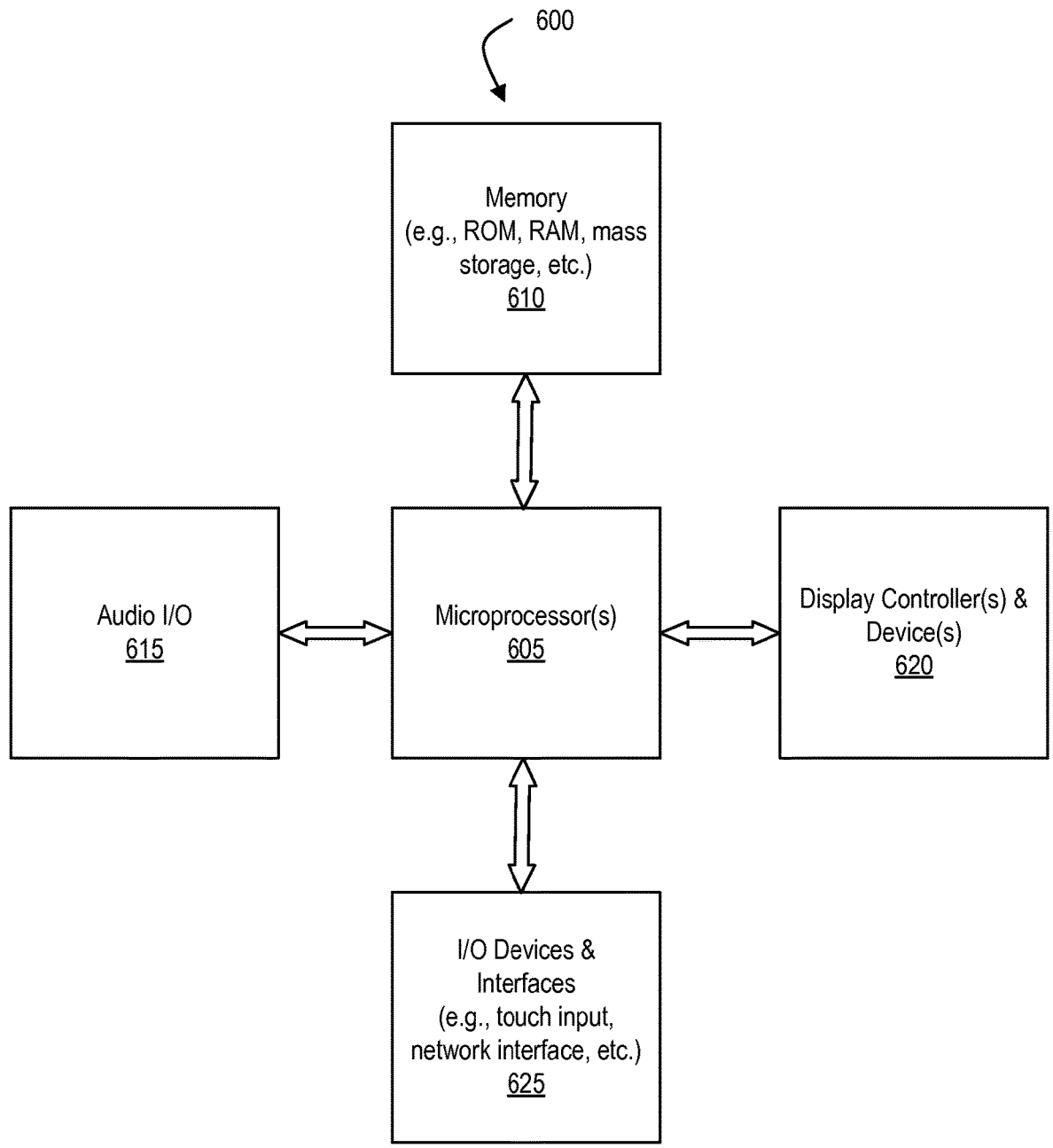
FIG. 6 illustrates, in block diagram form, an exemplary processing system to perform load balancing traffic among and managing traffic between network edge nodes.

FIG. 6 illustrates, in block diagram form, an exemplary processing system 600 to perform load balancing traffic among and managing traffic between virtual machines within a single LAG. Data processing system 600 includes one or more microprocessors 605 and connected system components (e.g., multiple connected chips). Alternatively, data processing system 600 is a system on a chip.

Data processing system 600 includes memory 610, which is coupled to microprocessor(s) 605. Memory 610 may be used for storing data, metadata, and programs for execution by the microprocessor(s) 605. Memory 610 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 610 may be internal or distributed memory.

Data processing system 600 also includes audio input/output subsystem 615 which may include a microphone and/or a speaker for, for example, playing back music or other audio, receiving voice instructions to be executed by microprocessor(s) 605, playing audio notifications, etc. Display controller and display device 620 provides a visual user interface for the user.

Data processing system 600 also includes one or more input or output ("I/O") devices and interfaces 625, which are provided to allow a user to provide input to, receive output from, and otherwise transfer data to and from the system. I/O devices 625 may include a mouse, keypad or a keyboard, a touch panel or a multi-touch input panel, camera, optical scanner, network interface, modem, other known I/O devices or a combination of such I/O devices.

I/O devices and interfaces 625 may also include a port, connector for a dock, or a connector for a USB interface, FireWire, Thunderbolt, Ethernet, Fibre Channel, etc. to connect the system 600 with another device, external component, or a network. Exemplary I/O devices and interfaces 625 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 600 with another device, external component, or a network and receive stored instructions, data, tokens, etc.

It will be appreciated that one or more buses, may be used to interconnect the various components shown in FIG. 6.

Data processing system 600 is an exemplary representation of one or more of the hosts 105, management server(s) 165, and client device 185 described above. Data processing system 600 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 600 may be a network computer, server, or an embedded processing device within another device or consumer electronic product. As used herein, the terms computer, device, system, processing system, processing device, and "apparatus comprising a processing device" may be used interchangeably with data processing system 600 and include the above-listed exemplary embodiments.

It will be appreciated that additional components, not shown, may also be part of data processing system 600, and, in certain embodiments, fewer components than that shown in FIG. 6 may also be used in data processing system 600. It will be apparent from this description that aspects of the inventions may be embodied, at least in part, in software. That is, the computer-implemented method 200 may be carried out in a computer system or other data processing system 600 in response to its processor or processing system 605 executing sequences of instructions contained in a memory, such as memory 610 or other non-transitory machine-readable storage medium. The software may further be transmitted or received over a network (not shown) via network interface device 625. In various embodiments, hardwired circuitry may be used in combination with the software instructions to implement the present embodiments. Thus, the techniques are not limited to any specific combination of hardware circuitry and software, or to any particular source for the instructions executed by data processing system 600.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses distinct name spaces to isolate the containers from each other and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

It should be recognized that while the specification refers to VMs, the examples given could be any type of DCNs, including physical hosts, VMs, non-VM containers, and hypervisor kernel network interface modules. In fact, the example networks could include combinations of different types of DCNs in some embodiments.

In the foregoing specification, the invention has been described with reference to specific exemplary embodiments thereof. Various embodiments and aspects of the invention(s) are described with reference to details discussed in this document, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used in this document, the term "exemplary" refers to embodiments that serve as simply an example or illustration. The use of exemplary should not be construed as an indication of preferred examples. Blocks with dashed borders (e.g., large dashes, small dashes, dot-dash, dots) are used in this document to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described in this document may be performed with fewer or more features/blocks or the features/blocks may be performed in differing orders. Additionally, the methods described in this document may be repeated or performed in parallel with one another or in parallel with different instances of the same or similar methods.

What is claimed is:

1. A computer-implemented method comprising:
    maintaining, by a first network edge device comprising a first physical network interface and a plurality of logical interfaces, a mapping between the first physical network interface and the plurality of logical interfaces, wherein a second network edge device comprises a second physical network interface and a copy of each of the plurality of logical interfaces and maintains a second mapping between the second physical network interface and each copy of the plurality of logical interfaces, and wherein for each of the plurality of logical interfaces: there is assigned a corresponding networking address that is also assigned to the corresponding copy of the logical interface at the second network edge device such that the corresponding networking address is replicated across the first and second network edge devices;
    receiving, at the first physical network interface, a first packet including a source address of a source device and a destination address of a destination logical interface corresponding to one of the plurality of logical interfaces and the corresponding copy of the one of the plurality of logical interfaces, wherein the first packet is received at the first physical network interface as a result of a network switch selecting the first physical network interface from a plurality of physical networks interfaces in a link aggregation group (LAG) by applying a load balancing algorithm, the plurality of physical network interfaces comprising the first physical network interface and the second physical network interface; and
    receiving, at the second physical network interface, a second packet including a second source address of a second source and the destination address, wherein the second packet is received at the second physical network interface as a result of the network switch selecting the second physical network interface from the plurality of physical network interfaces in the LAG by applying the load-balancing algorithm.

2. The computer-implemented method of claim 1, further comprising:
    configuring, via negotiation by the first network edge device with the network switch, the first physical network interface to be included in the LAG.

3. The computer-implemented method of claim 2, further comprising:
    receiving, at the first physical network interface, a third packet including a third source address and a second destination address;
    determining, by the first network edge device, that the second destination address is assigned to a logical interface that is unique to the second network edge device; and
    transmitting the third packet from a first synchronization network interface of the first network edge device to a second synchronization network interface of the second network edge device in response to determining that the second destination address is assigned to the logical interface that is unique to the second network edge device, the first synchronization network interface being excluded from sharing any LAG with any ports of the second network edge device and the second synchronization network interface being excluded from sharing any LAG with any ports of the first network edge device.

4. The computer-implemented method of claim 3, wherein transmitting the third packet includes encapsulating the third packet and transmitting the encapsulated third packet using a tunneling protocol.

5. The computer-implemented method of claim 4, wherein the first packet is a broadcast packet, the method further comprising:
    receiving, at the first synchronization network interface, a duplicate of the first packet; and
    dropping, by the first network edge device, the duplicate of the first packet.

6. The computer-implemented method of claim 1, wherein each of the plurality of logical interfaces is a virtual network gateway for a corresponding subnet.

7. The computer-implemented method of claim 6, further comprising:
    receiving, at the second physical network interface, a third packet including a first layer destination networking address and a second layer destination networking address;
    determining, by the second network edge device, the first layer destination networking address is mapped to a device within the subnet corresponding to the destination logical interface and the second layer destination networking address is mapped to the destination logical interface;
    modifying, by the second network edge device, the packet to replace the second layer destination networking address with a different second destination layer networking address assigned to the device; and
    forwarding the modified packet to the device within the subnet.

8. A non-transitory computer-readable medium storing instructions, which when executed by a physical computing system, cause the physical computing system to perform a method comprising:
    maintaining, by a first network edge device comprising a first physical network interface and a plurality of logical interfaces, a mapping between the first physical network interface and the plurality of logical interfaces, wherein a second network edge device comprises a second physical network interface and a copy of each of the plurality of logical interfaces and maintains a second mapping between the second physical network interface and each copy of the plurality of logical interfaces, and wherein for each of the plurality of logical interfaces: there is assigned a corresponding networking address that is also assigned to the corresponding copy of the logical interface at the second network edge device such that the corresponding networking address is replicated across the first and second network edge devices;

receiving, at the first physical network interface, a first packet including a source address of a source device and a destination address of a destination logical interface corresponding to one of the plurality of logical interfaces and the corresponding copy of the one of the plurality of logical interfaces, wherein the first packet is received at the first physical network interface as a result of a network switch selecting the first physical network interface from a plurality of physical networks interfaces in a link aggregation group (LAG) by applying a load balancing algorithm, the plurality of physical network interfaces comprising the first physical network interface and the second physical network interface; and receiving, at the second physical network interface, a second packet including a second source address of a second source and the destination address, wherein the second packet is received at the second physical network interface as a result of the network switch selecting the second physical network interface from the plurality of physical network interfaces in the LAG by applying the load-balancing algorithm.

9. The non-transitory computer-readable medium of claim 8, the method further comprising:
configuring, via negotiation by the first network edge device with the network switch, the first physical network interface to be included in the LAG.

10. The non-transitory computer-readable medium of claim 9, the method further comprising:
receiving, at the first physical network interface, a third packet including a third source address and a second destination address;
determining, by the first network edge device, that the second destination address is assigned to a logical interface that is unique to the second network edge device; and
transmitting the third packet from a first synchronization network interface of the first network edge device to a second synchronization network interface of the second network edge device in response to determining that the second destination address is assigned to the logical interface that is unique to the second network edge device, the first synchronization network interface being excluded from sharing any LAG with any ports of the second network edge device and the second synchronization network interface being excluded from sharing any LAG with any ports of the first network edge device.

11. The non-transitory computer-readable medium of claim 10, wherein transmitting the third packet includes encapsulating the third packet and transmitting the encapsulated third packet using a tunneling protocol.

12. The non-transitory computer-readable medium of claim 11, wherein the first packet is a broadcast packet, the method further comprising:

receiving, at the first synchronization network interface, a duplicate of the first packet; and
dropping, by the first network edge device, the duplicate of the first packet.

13. The non-transitory computer-readable medium of claim 8, wherein each of the plurality of logical interfaces is a virtual network gateway for a corresponding subnet.

14. The non-transitory computer-readable medium of claim 13, wherein:
the second network edge device receives, via the second physical network interface, a third packet including a first layer destination networking address and a second layer destination networking address;
the second network edge device determines the first layer destination networking address is mapped to a device within the subnet corresponding to the destination logical interface and the second layer destination networking address is mapped to the destination logical interface;
the second network edge device modifies the packet to replace the second layer destination networking address with a different second destination layer networking address assigned to the device; and
the second network edge device forwards the modified packet to the device within the subnet.

15. A computer system comprising:
a first network edge device comprising a first physical network interface and a plurality of logical interfaces; and
a second network edge device comprising a second physical network interface and a copy of each of the plurality of logical interfaces;
wherein the first network edge device comprises:
a first processor; and
a first memory coupled to the first processor, the first memory storing first instructions which, when executed by the first processor, cause the first network edge device to:
maintain a mapping between the first physical network interface and the plurality of logical interfaces, wherein for each of the plurality of logical interfaces: there is assigned a corresponding networking address that is also assigned to the corresponding copy of the logical interface at the second network edge device such that the corresponding networking address is replicated across the first and second network edge devices; and
receive, at the first physical network interface, a first packet including a source address of a source and a destination address of a destination logical interface corresponding to one of the plurality of logical interfaces and the corresponding copy of the one of the plurality of logical interfaces, wherein the first packet is received at the first physical network interface as a result of a network switch selecting the first physical network interface from a plurality of physical networks interfaces in a link aggregation group (LAG) by applying a load balancing algorithm, the plurality of physical network interfaces comprising the first physical network interface and the second physical network interface; and
wherein the second network edge device comprises:
a second processor; and
a second memory coupled to the second processor, the second memory storing second instructions which, when executed by the second processor, cause the second network edge device to:
maintain a second mapping between the second physical network interface and each copy of the plurality of logical interfaces; and
receive, at the second physical network interface, a second packet including the destination address, wherein the second packet is received at the second physical network interface as a result of the network switch selecting the second physical network interface from the plurality of physical network interfaces in the LAG by applying the load-balancing algorithm.

16. The computer system of claim 15, wherein the first instructions further cause the first network edge device to:
configure, via negotiation by the first network edge device with the network switch, the first physical network interface to be included in the LAG.

17. The computer system of claim 16, wherein the first instructions further cause the first network edge device to:
receive, at the first physical network interface, a third packet including a second destination address;
determine, by the first network edge device, that the second destination address is assigned to a logical interface that is unique to the second network edge device; and
transmit the third packet from a first synchronization network interface of the first network edge device to a second synchronization network interface of the second network edge device in response to determining that the second destination address is assigned to the logical interface that is unique to the second network edge device, the first synchronization network interface being excluded from sharing any LAG with any ports of the second network edge device and the second synchronization network interface being excluded from sharing any LAG with any ports of the first network edge device.

18. The computer system of claim 17, wherein transmitting the third packet includes encapsulating the third packet and transmitting the encapsulated third packet using a tunneling protocol.

19. The computer system of claim 18, wherein the first packet is a broadcast packet, wherein the first instructions further cause the first network edge device to:
receive, at the first synchronization network interface, a duplicate of the first packet; and
drop, by the first network edge device, the duplicate of the first packet.

20. The computer system of claim 15, wherein each of the plurality of logical interfaces is a virtual network gateway for a corresponding subnet.

21. The computer-implemented method of claim 1, wherein the first packet comprises a first address resolution request, wherein the second packet comprises a second address resolution request, wherein each of the plurality of logical interfaces being assigned a corresponding networking address comprises each of the plurality of logical interfaces being assigned a corresponding first layer networking address and a corresponding second layer networking address, and further comprising:
determining, by the first network edge device, from a third mapping of first layer networking addresses of the plurality of logical interfaces to second layer networking addresses of the plurality of logical interfaces, a second layer networking address assigned to the destination logical interface;
transmitting, by the first network edge device to the source of the first address resolution request, a first address resolution response including the determined second layer networking address assigned to the destination logical interface;
determining, by the second network edge device from a copy of the third mapping, the second layer networking address assigned to the destination logical interface; and
transmitting, by the second network edge device to the second source of the second address resolution request, a second address resolution response including the determined second layer networking address assigned to the destination logical interface.

22. The non-transitory computer-readable medium of claim 8, wherein the first packet comprises a first address resolution request, wherein the second packet comprises a second address resolution request, wherein each of the plurality of logical interfaces being assigned a corresponding networking address comprises each of the plurality of logical interfaces being assigned a corresponding first layer networking address and a corresponding second layer networking address, and wherein the method further comprises:
determining, by the first network edge device, from a third mapping of first layer networking addresses of the plurality of logical interfaces to second layer networking addresses of the plurality of logical interfaces, a second layer networking address assigned to the destination logical interface;
transmitting, by the first network edge device to the source of the first address resolution request, a first address resolution response including the determined second layer networking address assigned to the destination logical interface;
determining, by the second network edge device from a copy of the third mapping, the second layer networking address assigned to the destination logical interface; and
transmitting, by the second network edge device to the second source of the second address resolution request, a second address resolution response including the determined second layer networking address assigned to the destination logical interface.

23. The computer system of claim 15, wherein the first packet comprises a first address resolution request, wherein each of the plurality of logical interfaces being assigned a corresponding networking address comprises each of the plurality of logical interfaces being assigned a corresponding first layer networking address and a corresponding second layer networking address, wherein the first instructions further cause the first network edge device to:
determine from a third mapping of first layer networking addresses of the plurality of logical interfaces to second layer networking addresses of the plurality of logical interfaces, a second layer networking address assigned to the destination logical interface; and
transmit, to the source of the first address resolution request, a first address resolution response including the determined second layer networking address assigned to the destination logical interface.

* * * * *